United States Patent
Berclaz et al.

(12) 
(10) Patent No.: US 6,455,097 B1
(45) Date of Patent: *Sep. 24, 2002

(54) METHOD AND APPARATUS FOR APPLYING A TREATING LIQUID TO A POROUS BODY

(75) Inventors: Georges Berclaz, Veyras/Sierre; Gaynor Johnston, Carouge, both of (CH); Vittorio de Nora, Nassau (BS)

(73) Assignee: Moltech Invent S.A. (LU)

( * ) Notice: Subject to any disclaimer, the term of this patent is extended or adjusted under 35 U.S.C. 154(b) by 0 days.

This patent is subject to a terminal disclaimer.

(21) Appl. No.: 09/101,427

(22) PCT Filed: Jan. 10, 1997

(86) PCT No.: PCT/IB97/00009

§ 371 (c)(1), (2), (4) Date: Dec. 23, 1998

(87) PCT Pub. No.: WO97/26227

PCT Pub. Date: Jul. 24, 1997

(51) Int. Cl.[7] .............................. B05D 1/18; B05D 1/32; B05D 3/04; B05C 3/02
(52) U.S. Cl. .............................. 427/8; 427/58; 427/113; 427/294; 427/282; 427/314; 427/430.1; 118/50; 118/64; 118/668; 118/679; 118/689; 118/406
(58) Field of Search .............................. 427/8, 58, 113, 427/294, 282, 314, 430.1; 118/50, 64, 668, 679, 689, 406

(56) References Cited

U.S. PATENT DOCUMENTS 4,550,034 A * 10/1985 Shimrock et al. ........... 427/243
6,228,424 B1 * 5/2001 de Nora et al. .............. 427/243

FOREIGN PATENT DOCUMENTS

| GB | 1079386 | * | 8/1967 |
| WO | WO 94/28200 | * | 12/1994 |

* cited by examiner

Primary Examiner—Michael Barr
(74) Attorney, Agent, or Firm—Jayadeep R. Deshmukh

(57) ABSTRACT

A method of applying a treating liquid to a porous body (11), in particular a pre-baked carbon component of an aluminium production cell, such as an anode block, a cathode block or a sidewall. In this method first the body (11) to be treated is inserted, with its part to be treated facing up, in the treating chamber (12). At least one sealing member (13) is then applied to the body so as to isolate a space (14) in an upper part of the treating chamber (12) around the part of the body to be treated from a lower part (15) of the treating chamber around a bottom part of the body which is not to be treated. Next, treating liquid (10) is supplied to the upper part (14) of the treating chamber to cover the part of the body to be treated with the treating liquid and applying a vacuum to intake an amount of the treating liquid into pores in the part of the body to be treated. Then the body (11) is freed from the sealing member(s) (13), and removed from the treating chamber (12).

45 Claims, 5 Drawing Sheets

METHOD AND APPARATUS FOR APPLYING A TREATING LIQUID TO A POROUS BODY

FIELD OF THE INVENTION

The invention relates generally to a method of applying a treating liquid to a porous body, in particular a prebaked carbon component of an aluminium production cell, such as an anode block or a cathode block, by placing the body in a treating chamber and impregnating at least a part thereof with the treating liquid, this impregnation being assisted by the application of a pressure differential.

The invention also relates to an apparatus for carrying out this method and use of the apparatus for applying a treating liquid to a prebaked carbon component of an aluminium production cell.

BACKGROUND OF THE INVENTION

The treatment of prebaked carbon components of aluminium production cells, such as anode blocks, cathode blocks or cell sidewalls to improve their resistance to the conditions prevailing in the cell has already been proposed.

WO 94/29200 (Manga niello et al.) discloses treating a prebaked carbon-based anode of an electrolytic cell for the production of aluminium, in particular by the electrolysis of alumina in a molten fluoride electrolyte, over its sides and top to improve the resistance thereof to erosion during operation of the cell by air and oxidising gases released at the anode, by immersing the anode in a boron-containing solution containing 5–60 weight % of $H_3BO_3$ or $B_2O_3$ in methanol, ethylene glycol, glycerin or water.

It was found advantageous to carry out this treatment with a heated solution, but this involved heating of the anode, which consumed large quantities of energy. Attempts were therefore made to carry out the process at ambient temperature because no special heating equipment would be required. Low temperature application however required the careful choice of solvents and surfactant agents in order to reduce the treatment time as far as possible.

For prebaked anodes, only the top and top side surfaces need to be protected, so it was suggested to dip the anode upside down into the solution. But this is impractical when the anodes are fitted with rods for connection to a suspension device which also serves as a current lead-in. Furthermore, it is inconvenient to treat the anodes first and then fix the suspension rods.

To overcome this difficulty it would be possible to dip the anode in the treating solution with the rodded top side up, and protect the bottom part of the anode by blocking its pores with a fugitive agent that prevents impregnation with the boron-containing compound, and can be removed afterwards. This however entails additional operations and careful selection of the fugitive agent.

To speed up the process, it was suggested to assist the impregnation by the application of a pressure differential, by pressure or vacuum. However, no practical way of doing this was disclosed.

It is known from WO 93/25731 (Sekhar/de Nora) to treat carbon-containing components of an aluminium production cell to protect them from attack by liquid elements, ions or compounds by applying a coating of a refractory boride from a slurry composed of particulate refractory boride in a colloidal carrier. Sometimes it is desirable to apply such coatings selectively to the parts of the components which will be exposed, but methods and apparatus for doing this remain to be developed.

WO 94/24069 (Sekhar) describes treating components of aluminium production cells by impregnating them with various colloidal agents. U.S. Pat. No. 5,534,130 (Sekhar) describes the protection of the cell sidewalls of aluminium production cells by impregnating them with agents based on aluminium phosphate. Again, it would be desirable to perfect ways of applying these methods to selected parts of the components in an efficient manner.

SUMMARY OF THE INVENTION

It is an object of the present invention to obviate the above-described problems and shortcomings of the available methods and apparatus.

It is another object of the invention to provide a method and apparatus of the above type in which anode blocks or other bodies can be treated without necessarily pre-heating the bodies, while assuring an effective impregnation of the treating liquid into the pores of the treated part, and enabling the treatment of large numbers of the bodies in an efficient manner.

A particular object of the invention is to provide a method and apparatus which can use a hot treating solution in a very efficient manner to treat selected parts of the body, without necessarily heating the treated body substantially above ambient temperatures (although it is contemplated that treatments with cold solutions and hot anodes are also possible).

The method and apparatus of the invention were developed specifically with a view to overcoming the above-mentioned difficulties encountered when treating rodded prebaked anodes, but the method and apparatus can be used to treat other components of aluminium production cells and generally any porous bodies that need to be treated over part of their surface.

A method according to the invention comprises the following steps.

First, the body to be treated, in particular an anode block, a cathode block or a sidewall for an aluminium electrowinning cell is inserted, with its part to be treated facing up, in the treating chamber.

At least one sealing member is then applied to the inserted body in such a manner as to isolate the chamber into two parts: an upper part of the treating chamber around the part of the body to be treated, isolated from a lower part of the treating chamber around a bottom part of the body which is not to be treated.

Next, the upper part of the treating chamber is filled with a treating liquid to cover the part of the body to be treated, and a pressure differential is applied to intake an amount of the treating liquid into pores in the part of the body to be treated so that the pores of the body become impregnated with the treating liquid. The pressure differential may be applied simply by evacuating the lower part of the treating chamber. Application of the pressure differential is usually continued until all of the pores of the part of the body to be treated are filled. The exact degree of penetration can however be chosen for any particular application, e.g,. stopping the application of the pressure differential before all the pores are filled, or continuing the pressure differential for some time after the pores have been filled.

After completion of the impregnation, treating liquid which has not been absorbed by the body but remains in the upper part of the treating chamber is removed from the treating chamber, before or after the sealing member or members is/are released to free the body, and the treated body is removed from the treating chamber.

The sealing member may be arranged to surround the body and fit around its sides. In this case, the sealing member(s) is/are preferably arranged to allow a loose fit around a body, permitting insertion and removal thereof into or from the treating chamber, or to provide a sealing fit around a body in the treating chamber. Adjustment of the sealing member(s) can for example be controlled hydraulically, pneumatically, mechanically or electro-mechanically.

Bringing the sealing member to the sealing position can for example be controlled by detecting when the body reaches a given position, and actuating the sealing member (s) to sealably engage with the body when the body has reached said given position.

The or each sealing member preferably comprises an elastomeric body which is elastically deformed to provide sealing contact when applied against a body to be treated.

Alternatively, the sealing member can be arranged to apply or be applied against the bottom face of the body to be treated, thus allowing treatment of the entire sides and top of the body, or at least the lower parts of the sides.

The treating liquid in the upper part of the treating chamber is usually maintained at a temperature well above that of the body to be treated, for example a temperature in the range 60° to 120° C. To maintain the treating liquid at a more-or-less constant temperature, it is necessary to heat it to compensate for heat loss due to contact of the treating liquid with the body.

Alternatively, different temperature differentials can be used, for instance a hot body can be dipped in a cool treatment liquid, or the body and the treatment liquid can be at the same temperature.

In one embodiment of the method, treating liquid is circulated by the following arrangement. Hot treating liquid is supplied from a reservoir to the upper part of the treating chamber and, after treatment of the body, treating liquid which remains in the upper part of the treating chamber is returned back to the reservoir. The treating liquid in the reservoir is stirred and heated to maintain a desired temperature. Components of the treating liquid can be added to the reservoir at a rate to compensate for consumption of the treating liquid in the treating process.

Another inventive aspect is a method of supplying the treating liquid which comprises providing a saturated solution of the treating agent at a given temperature, and deriving, from said saturated solution, a non-saturated solution of the treating agent. The non-saturated treating solution is then supplied to said upper part of the treating chamber.

For example, the non-saturated solution is obtained by increasing the temperature of the solution so that the non-saturated solution contains the treating agent at the same concentration, which corresponds to the saturation concentration at said given temperature, but is simply at a higher temperature.

The method advantageously comprises the following sequential steps:

1) Actuating the sealing member(s) to sealably engage with a body inserted in the treating chamber when the body has reached a given position.
2) Filling the upper part of the treating chamber with hot treating liquid.
3) Evacuating the lower part of the treating chamber.
4) If necessary, applying heat to treating liquid in the upper part of the treating chamber to compensate for heat loss due to contact of the liquid with the body.
5) Ceasing to evacuate the lower part of the treating chamber; and
6) Removing remaining treating liquid from the treating chamber, before, during or after releasing the sealing member(s) to allow removal of the treated body from the treating chamber.

All of these steps can be automated, allowing a very efficient treatment of the bodies with minimum heat losses.

The treating liquid is preferably a solution which impregnates the part of the body to be treated, in particular a liquid containing an oxidation retardant agent such as one containing at least one soluble compound of boron, phosphorous or silicon for improving the resistance to oxidation of the carbon.

Alternatively, the treating liquid may be a suspension containing particles which block the surface pores of the body to be coated. Such a suspension may contain a colloid selected from colloidal alumina, silica, yttria, ceria, thoria, zirconia, magnesia, lithia, monoaluminium phosphate or cerium acetate.

For certain applications, for example for treating the surface of cathode blocks, the treating solution may contain particulate refractory boride, such as $TiB_2$, and/or aluminium powder, chips or cuttings.

The treated body may be a pre-baked anode of an aluminium production cell, which anode is rodded, i.e. has a rod attached to its top face for connection of the anode to a suspension device which also serves as a current lead-in. Using the method and apparatus of the invention, rodded anodes can easily be treated with their rodded side up, which greatly facilitates handling.

The treated body may alternatively be part of a sidewall of an aluminium production cell, or a cathode block of an aluminium production cell.

The invention also relates to an apparatus for applying a treating liquid to a porous body by the method set out above.

The apparatus according to the invention for carrying out this method comprises a treating chamber having at least one sealing member which is arranged to be applied to a body to be treated which is placed in the treating chamber. The sealing member or members is/are arranged so as to isolate an upper part of the treating chamber around the part of the body to be treated from a lower part of the treating chamber around a bottom part of the body which is not to be treated.

Means are provided for filling the upper part of the treating chamber with a treating liquid to cover the part of the body to be treated. These means can include a pump for pumping treating liquid from a supply reservoir.

Means are also provided for applying a pressure differential to intake an amount of the treating liquid into pores in the part of the body to be treated, in particular by applying a vacuum to the lower part of the treating chamber.

Lastly, means are provided for removing remaining treating liquid, which has not been absorbed by the body during the treatment, from the treating chamber. These means can include another pump for pumping residual treating liquid back to the supply reservoir.

The sealing member(s) may surround the body and fit around its sides, and is/are conveniently arranged to be adjustable—for example by hydraulic, pneumatic, mechanical or electro-mechanical control—to allow either a loose fit around a body permitting insertion and removal thereof into or from the treating chamber, or a sealing fit around a body inserted in the treating chamber.

The or each sealing member may comprise an elastomeric body which is elastically deformable when applied against a body to be treated. Such bodies can apply against the bottom of the body to be treated when it is decided to treat the complete sides and top of the body or at least the lower part of the sides.

A detector can be provided which detects the position of a body introduced into the treating chamber and actuates the sealing member(s) to cause them to sealably engage with the body when the body has reached a given position.

When a hot treatment liquid is to be used to treat bodies at ambient temperature, the treating chamber can be provided with means for heating the treating liquid in the upper part of the treating chamber to compensate for heat loss due to contact of the liquid with the body. Other arrangements to achieve a thermal balance can be used, as appropriate.

An embodiment of the apparatus comprises a reservoir for treating liquid, from which hot treating liquid is supplied to the top part of the treating chamber and to which remaining treating liquid, which has not been absorbed by the body during the treatment, is returned from the upper part of the treating chamber. This reservoir comprises means for heating and means for stirring the treating liquid therein. A metering device can be provided for adding components of the treating liquid to the reservoir to compensate for consumption of the treating liquid in the treating process.

A preferred storage vessel or reservoir —which can be used for various treatments—comprises first and second compartments, the first compartment containing a reserve supply of the hot treating solution in contact with a mass of the treating agent at a temperature $T_1$. In the first compartment, the treating agent is dissolved at a concentration which corresponds to the saturation concentration, at temperature $T_1$. The second compartment contains a supply of non-saturated treating solution in which the treating agent is dissolved at the same concentration but at a temperature $T_2$ above said temperature $T_1$, or at the same temperature but a lower concentration. The vessel further comprises: means for maintaining the hot treating solution in each of the first and second compartments at the respective temperature; an outlet conduit for supplying the non-saturated hot treating solution from the second compartment of the vessel to treat a body or material; and a conduit for supplying hot treating solution from the first compartment to the second compartment to compensate for consumption/loss of the treating liquid by treatment of the body or material.

The apparatus preferably comprises a control device arranged to sequentially actuate:

1) Means for bringing the sealing member(s) to sealably engage with the body when the body has reached a given position;
2) Means for filling the upper part of the treating chamber with hot treating liquid;
3) Means for applying a vacuum to the lower part of the treating chamber;
4) If needed, means for applying heat to treating liquid in the upper part of the treating chamber to compensate for cooling of the liquid by contact with the body;
5) Stopping the application of the vacuum to the lower part of the treating chamber; and
6) Means for removing remaining treating liquid from the treating chamber before, during or after relaxing the means for engaging the sealing member(s) to allow removal of the treated body from the treating chamber.

An advantage of the above-outlined method and apparatus is that it is possible to treat large bodies such as prebaked anodes without a need to pre-heat them. However, the bodies can be pre-heated if required. In particular, it can be useful to locally pre-heat the top part of the bodies to be treated.

Another advantage is that the method and apparatus allow sequential treatments to be carried out on the top part of the same body, over the same area or over a different area, using the same treating liquid or different treating liquids/slurries.

DETAILED DESCRIPTION OF THE INVENTION

Figure 1:
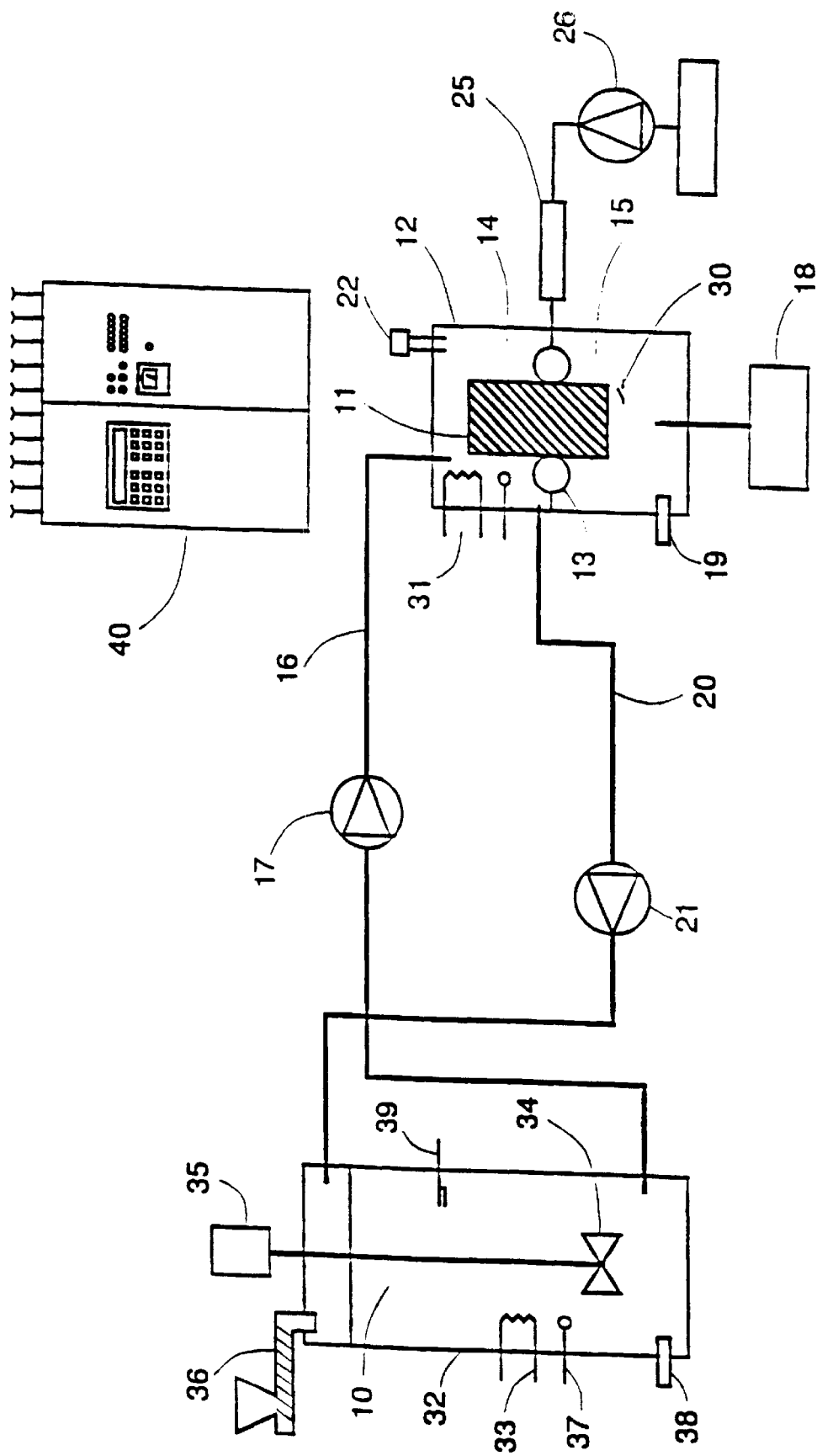
FIG. 1 is a schematic diagram of an apparatus for carrying out the method according to the invention.

FIG. 1 schematically shows an apparatus for applying a treating liquid 10 to a porous body 11 by the method of the invention. The apparatus comprises a treating chamber 12 having an upper part 14 and a lower part 15. The upper part 14 is open-topped and may be provided with a removable cover or lid.

A sealing member 13 consisting of several sections of elastomeric material is arranged to surround a body 11 to be treated when the body is placed in the treating chamber 12 by inserting it into the open top by means of an automatic handling device (not shown). In the case of square or rectangular bodies 11 such as prebaked carbon anodes of aluminium production cells, four sections of elastomeric material can be arranged around the four sides, each section being associated with a series of hydraulic, pneumatic or mechanically actuated cylinders, one such hydraulic cylinder 25 being shown in FIG. 1.

This sealing member 13, when it is tightened around the body 11, isolates a space in the upper part 14 of the treating chamber around the part of the body 11 to be treated, from a lower part 15 of the treating chamber around a bottom part of the body 11 which is not to be treated.

Figure 2:
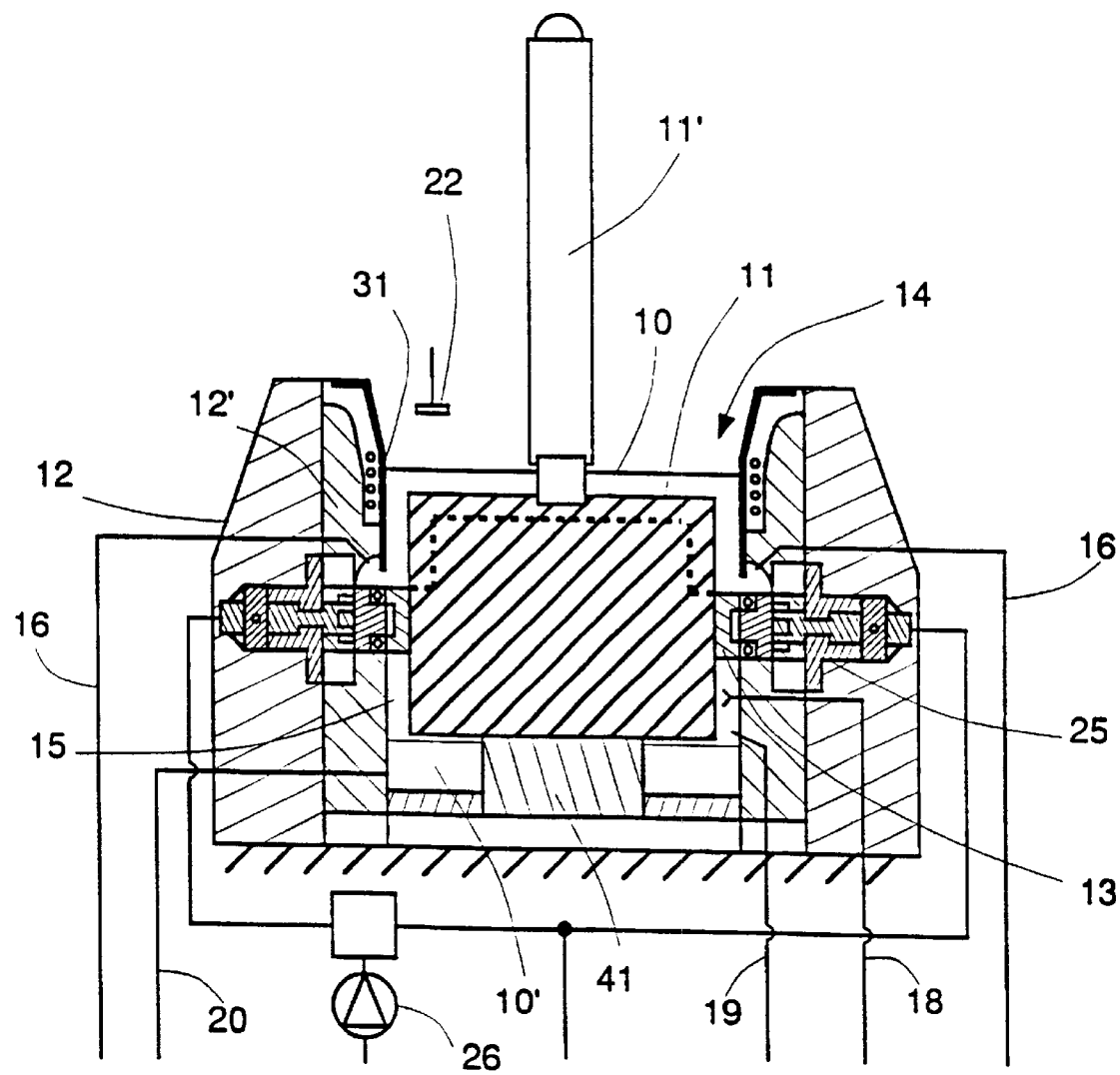
FIG. 2 is a schematic cross-sectional view of one embodiment of the treatment chamber for an apparatus like that of FIG. 1.

Isolation of the upper and lower parts 14, 15 of chamber 12 can be achieved by means of a flexible skirt associated with the sections of the sealing member 13, or by arranging the sections of the sealing member 13 to fluid-tightly protrude from a groove or the like around the chamber wall (see FIG. 2).

A supply conduit 16 for treating liquid leads into the upper part 14 of the treating chamber. Conduit 16 leads from a reservoir 32 of treating liquid 10 and has a supply pump 17 by means of which treating liquid 10 can be supplied to the upper part 14 of the treating chamber so as to cover the part of the body 11 to be treated, up to a level determined by a sensor 22.

A Venturi or vacuum pump 18 is connected to the lower part 15 of chamber 12 for evacuating the space around the underside of the body 11. When the Venturi or vacuum pump 18 is switched on, air filling the pores of body 11 is evacuated, which causes an amount of the treating liquid 10 in the upper part 14 of chamber 12 to be intaken into the part of the body 11 to be treated. A pressure detector 19 is provided in the lower part 15 of chamber 12. This detector 19 is sensitive to the change in pressure which occurs when all of the pores of the part of body 11 being treated are filled.

An outlet conduit 20 is connected to the bottom of the upper part 14 of the chamber. This conduit 20 leads back to the reservoir 32 and has a pump 21 for returning treating liquid remaining in the chamber at the end of treatment of a body 11 back to the reservoir 32.

A hydraulic system, comprising a hydraulic cylinder 25 controlled by a hydraulic pump 26, is provided for adjusting the sealing member 13 which is connected to a piston of the hydraulic pump 26. When this piston is pulled into its cylinder 25, the member 13 is pulled out to allow a loose fit around a body 11, permitting insertion and removal of the body 11 into or from the treating chamber 12. When the piston is pushed out of its cylinder 25, the sealing member 13 is tightened around the body 11 to provide a sealing fit, by elastic deformation of the elastomeric material making up the sections of sealing member 13 when they are applied against the body 11 under the pressure applied by the hydraulic control.

Alternatively, it is possible to control the sealing member 13 pneumatically, mechanically or electro-mechanically.

A position detector 30 is provided in the lower part 15 of the treating chamber for detecting when a body 11 introduced into chamber 12 reaches a predetermined position. This position depends on the size of the body 11 and corresponds to the level of the bottom of the body 11 when the top of the body to be treated is at a level where it will be covered by treating liquid 10 in the upper part 14 of the chamber. The detector 30 is arranged to actuate the hydraulic pump 26 and hydraulic cylinder 25 to bring the sealing member 13 to sealably engage with the body 11 when the body 11 has reached the given position.

The treating chamber 12 comprises a heater 31 for heating the treating liquid 10 in the upper part 14 of chamber 12. The heater 31 can be an electric heater or can operate by circulating hot air or another heating fluid. This heater 31 can be adjusted to supply an amount of heat which compensates for heat loss due to contact of liquid 10 with body 11, i.e. depending on the size and temperature of the body 11 and its thermal characteristics, and the operating temperature of the treating liquid 10. If required, the heater 31 can be replaced by means for maintaining a proper thermal balance e.g. if hot anodes are treated in a cold treating liquid.

While for certain treatments a cold treating liquid can be supplied to the treating chamber 12, the reservoir 32 preferably supplies hot treating liquid 10 to the top part 14 of the treating chamber and, after the end of the treatment of a body 11, treating liquid remaining is returned to the reservoir 32 via conduit 20. The reservoir 32 is externally insulated and is fitted with a heater 33 for maintaining the treating liquid 10 at a selected temperature controlled by a thermostat 37. A stirrer 34 constantly or intermittently driven by a motor 35 stirs the treating liquid 10 contained in reservoir 32. In the embodiment shown in FIG. 1, at the top of reservoir 32 is a metering device 36 for adding components of the treating liquid 10 to the reservoir 32 in an amount to compensate for consumption of the treating liquid 10 in the treating process. The reservoir 32 also includes a pressure sensor 38 for monitoring the level of liquid 10 and a sensor 39 measuring the density or the conductivity of liquid 10, serving to control the metering device 36.

A preferred apparatus comprises a control panel schematically indicated at 40. This control panel includes controls for all routine adjustments such as temperature of the liquid in reservoir 32 and in the top part 14 of chamber 12, the liquid level to be controlled by sensor 22, etc. The control panel also includes an overall control arranged to sequentially perform the following operations:

First, the sealing member 13 is actuated (by the position detector 30 and hydraulic control 26/25) to sealably engage with the body 11 when the body 11 to be treated has reached the given position.

Next, the pump 17 is switched on to fill the upper part 14 of the treating chamber 12 with a quantity of hot treating liquid 10 from the reservoir 32, up to a level controlled by sensor 22.

Then, the lower part 15 of the treating chamber is evacuated by switching on the Venturi or vacuum pump 18, which evacuates air from the pores of body 11 and intakes treating liquid 10 into the surface pores.

In the case where the treating liquid is hot and the body 11 to be treated is cool, during the vacuum treatment, the heater 31 is switched on to heat the treating liquid 10 in the upper part 14 of the chamber 12 in order to compensate for cooling of the liquid 10 by contact with body 11, so that the treating liquid 10 remains at more-or-less constant temperature.

When the vacuum is applied, hot treating liquid is intaken into the pores of body 11. When the body 11 is at ambient temperature, the treating liquid heats the surface part of body 11, and the temperature of the treating liquid drops. As the pores fill with treating liquid, this liquid is diverted to fill those pores which still remain open. When all pores are full, the impregnation is sufficient and this is signaled by the pressure detector 19, which immediately or after a given time automatically switches off the Venturi or vacuum pump 18 and then actuates pump 21 to remove residual treating liquid 10 from the upper part 14 of the treating chamber.

For other process conditions, e.g. when a hot body is treated in a cool or hot treating liquid, the above procedure can be modified accordingly.

When all of the residual liquid 10 has been removed from the upper part 14 of the treating chamber, the hydraulic pump 26 is actuated to release the sealing member 13 and allow removal of the treated body 11 from the treating chamber 12 by an automatic handling device (not shown).

A typical body 11 to be treated is a prebaked carbon anode of an aluminium production cell. Such bodies usually have a porosity of about 20–24%, of which 10–12% is open porosity. A prebaked anode may weigh of the order of 1000 kg. Attached to its upper side of the anode is a steel rod 11' (see FIG. 2) for connection to a suspension device and which also serves as an electrical connection.

The treatment of prebaked anodes by known impregnation processes is difficult (because of the attached rod) and energy consuming (because of the need to heat the entire anode to a temperature at which the impregnation process will be effective).

With the method according to the invention, the treatment of prebaked anodes is advantageous, because the anode can be treated with its rodded side up and only the part which needs to be treated (the upper side shoulders and top) can be treated without preheating of the anode, in a simple treatment with the anode at ambient temperature and the treating liquid at a convenient temperature, say from 60° to 120° C. in a treatment lasting only a few minutes.

Moreover, due to the rapidity of the impregnation process, the treated anode or other body only takes up a small quantity of heat, so the process is very energy efficient.

FIG. 2 shows one embodiment of the treatment chamber 12 in greater detail. Like references are used to designate like parts. In this chamber 12, the hydraulic cylinders 25 are incorporated in the chamber side walls and the heater 31 is included inside the top part of an insulating lining 12' in the upper part 14 of chamber 12.

In the embodiment of FIG. 2, instead of having a position detector 30, the anode 11 to be coated rests on a support 41 whose height is selected as a function of the size of the anode or other body 11 to be coated. Also, the outlet conduit 20 leads into the bottom part 15 of chamber 12.

As before, the treating liquid 10 delivered by conduit 16 is contained in the top part 14 of the chamber during treatment of the top and upper sides of the anode 11. Then, after treatment, the sealing members 13 are retracted allowing used treating liquid 10' to flow down and accumulate in the bottom part 15 of the chamber from where it is removed via conduit 20, so that the liquid 10' remains at a level below the top of support 41 on which the bottom of the anode body 11 rests. Thus, in this embodiment, the operating cycle is slightly modified, i.e. used treating liquid is removed from the bottom part 15 of the chamber after releasing the sealing members 13.

In the embodiments described in connection with FIGS. 1 and 2, the sealing member 13 surrounds and acts against the sidewalls of the body 11. These embodiments are particularly suitable when it is desired to treat only the top and the upper side walls of the body 11, as indicated by the dotted line in FIG. 2.

Figure 3:
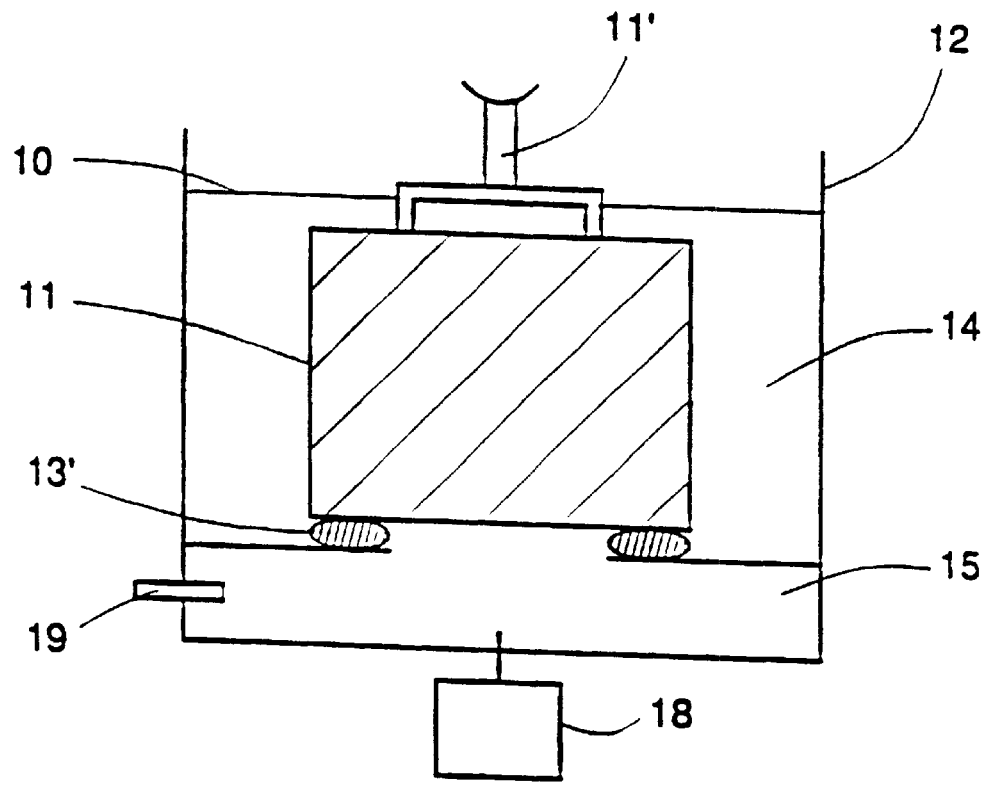
FIG. 3 is a schematic view of a varied treatment chamber.

When it is desired to treat the entire sidewalls of the body 11, the varied embodiment shown in FIG. 3 can be used. In this varied embodiment, the sealing member 13' consists of an elastomeric body on which the bottom face of the body 11 to be treated sits, so that the member 13' is compressed by the full weight of the body, or by part of the weight of the body 11 resting on it.

The sealing member 13' can for example be annular, such that the central part of the lower face of body 11 closes off the lower part 15 of the treating chamber in which the Venturi or vacuum pump 18 acts.

The sealing member 13' can be connected to the walls of the treating chamber 12 by a flexible skirt. It is also possible for the body 11 to be supported on a support 41 in the form of a ledge (see FIG. 3a) having a recess 42 which contains the sealing member 13' such that the sealing member 13' is adequately compressed when the body 11 rests on the ledge 41. It is also possible to arrange for adjustment of the level of the sealing member 13'/ledge 41 to accommodate for bodies of different sizes.

Figure 3A:
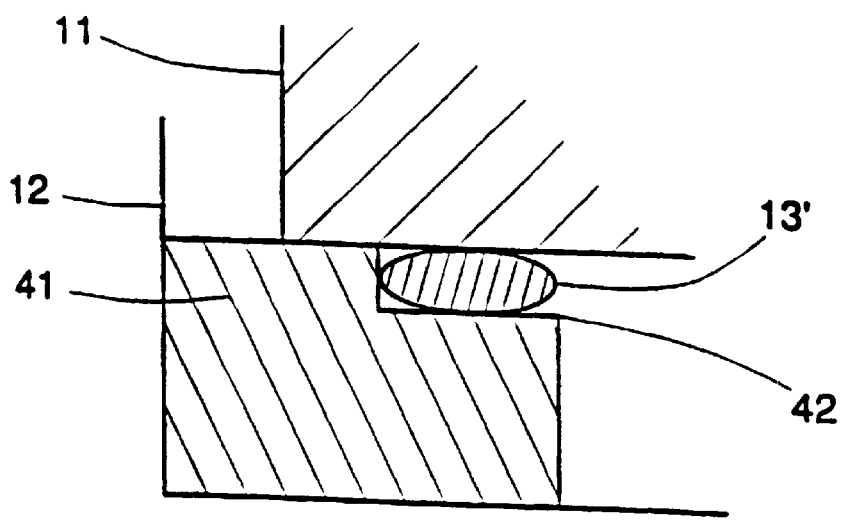
FIG. 3a shows a detail of a variation of the treatment chamber of FIG. 3.

The varied apparatus of FIGS. 3 and 3a can include all of the process control features previously described.

Figure 4:
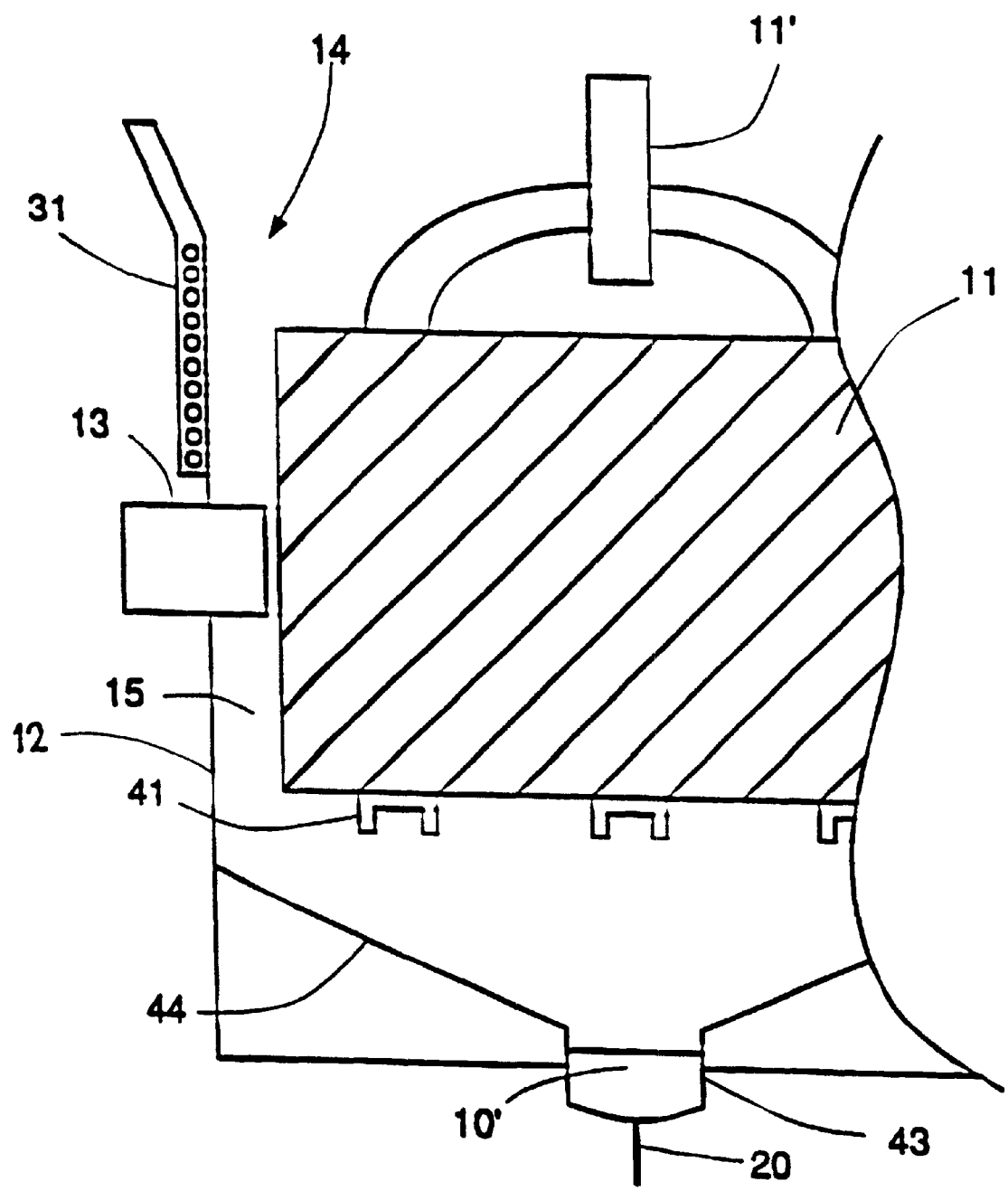
FIG. 4 is a schematic view of part of another treatment chamber.

FIG. 4 shows another treating chamber in which, when the sealing members 13 are retracted, as shown, the used treating liquid 10' flows down and is collected in the lower part of the treating chamber 12, in a channel or sump 43 at the bottom of an inclined surface 44 down which the liquid flows. The outlet 20 leads from this channel or sump 43 for return of the used liquid to the reservoir. As illustrated, the channel or sump 43 is preferably centrally located in chamber 12, but instead could be along one or more of the sides of the lower part 14 of the treating chamber.

Particularly when boron-based or phosphorous-based oxidation retardant solutions are used, a sloping floor arrangement like that shown in FIG. 4 ensures continuous draining of the used solution, which avoids unwanted deposits of the oxidation retardant. This simplifies maintenance of the apparatus and reduces operating costs.

As shown in FIG. 4, instead of being a pedestal or ledge, the support 41 can be a grid of adjustable height.

Figure 5:
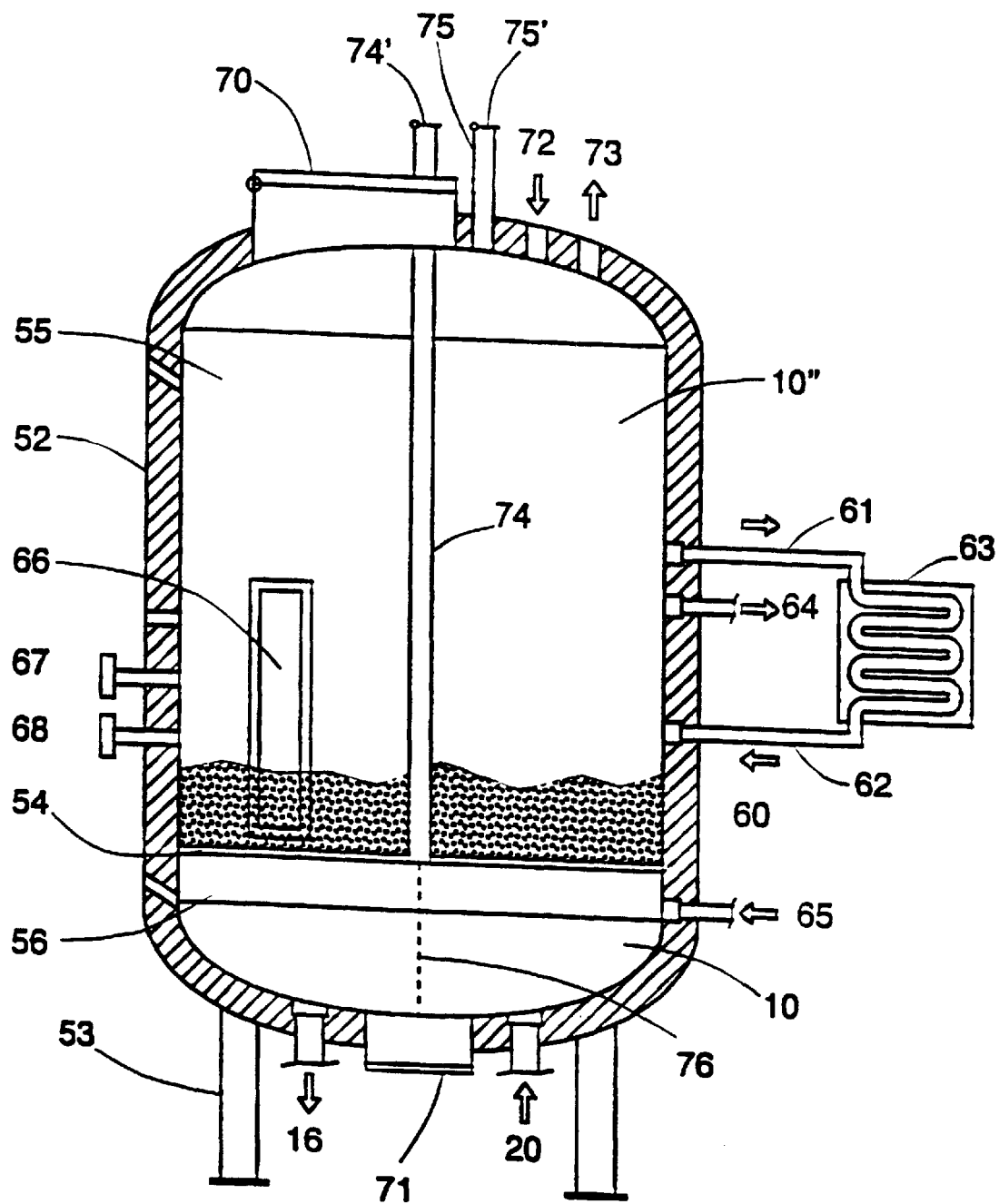
FIG. 5 is a schematic cross-sectional view of a preferred type of reservoir for preparing and supplying the treating liquid.

FIG. 5 shows the main components of a very advantageous design of a storage vessel or reservoir 52 for supplying the treating liquid 10 via a supply conduit 16 and returning used treating liquid to the reservoir 52 via a return conduit 20.

Reservoir 52 is separated by a horizontal inner divider wall 54 into an upper (or first) compartment 55 and a lower (or second) compartment 56. The upper compartment 55 contains saturated treating liquid 10" at a temperature $T_1$, this saturated treating liquid 10" being in contact with a mass 60 of undissolved treating agent on the divider wall 54. The lower compartment 56 contains a supply of non-saturated treating liquid 10 which is at the same concentration as that in compartment 55 but is at a temperature $T_2$ which is higher than $T_1$.

The reservoir 52 further comprises arrangements for maintaining the hot treating solution in the compartments 55 and 56 at the respective temperatures $T_1$ and $T_2$. As shown for compartment 55, such an arrangement comprises an outlet 61 and a return inlet 62 for circulating the hot liquid via a standard type of heat exchanger 63 which heats the circulating liquid to the desired temperature $T_1$ (or $T_2$) This heater/circulating arrangement also serves to stir the liquid in compartment 55 (or 56). Additional stirrers can be included if desired.

Compartment 55 has an outlet 64 and compartment 56 has an inlet 65 via which hot treating liquid 10" from compartment 55 at temperature $T_1$ can be transferred into compartment 56 where the liquid is maintained at a temperature $T_2$ above $T_1$. Heating the liquid from temperature $T_1$ to $T_2$ can be done between the outlet 64 and inlet 65, or in a separate heating/circulating device (like 61,62,63).

The reservoir 52 also has a window 66 in one face, through which the level of the undissolved treating material 60 can be monitored. As shown for compartment 55, a thermometer 67 and a manometer 68 are provided for monitoring the temperatures $T_1$ (or $T_2$) and the pressure in the respective compartment 55 (or 56).

At the top of reservoir 52 is a hinged cover 70 which can be manually opened for tipping into the compartment 55 a fresh supply of material 60 when needed, as can be visually ascertained by inspection via window 66. The material 60 can thus be supplied at convenient times by emptying. it, for example from a sack. The cover 70 is fitted with a seal to prevent the escape of fumes.

At the bottom of reservoir 52 is an optional manhole-type opening 71 that can be opened for manually removing debris etc. that may accumulate in the lower compartment 56. For this purpose, the lower compartment is fitted with a perforated dividing wall 76 for restraining the debris.

The reservoir further comprises a hot water inlet 72 and a hot water outlet 73 at the top of compartment 55. It is thus possible to include, inside the main compartment 55 of the reservoir 52, an internal hot water storage tank arranged so that, when needed, the stored hot water can be used to flush the conduits 61, 62 and the heat exchanger 63 to dissolve any deposits of the treating material deposited from the saturated liquid.

Also, each of the upper and lower compartments 55, 56 has a venting device for equalizing pressure therein. This consists of a vent tube 74, which connects the compartment 56 to the outside, having a spring-actuated closure flap 74' for venting in case of excess pressure in the compartment 56. Likewise, compartment 55 has a vent tube 75 closed by a spring-actuated closure flap 75'.

The described improved reservoir 52 can be used for supplying hot treating liquid for various processes; i.e. even without using a vacuum. For instance, it can be used to spray or otherwise apply a topcoating of the treating material onto a treated body. This reservoir 52 is very advantageous from several points of view.

By maintaining the treating solution at a selected temperature $T_1$ in compartment 55, the treating material therein is maintained dissolved, at a concentration which corresponds to the saturation concentration at that temperature $T_1$. This is achieved without any complex control means and without a need to meter in selected amounts of the treating material, simply by maintaining an excess of undissolved treating material 60, by adequate stirring, and by maintaining the temperature at the desired value $T_1$.

By maintaining the liquid in compartment 56 at temperature $T_2$ ($T_2 > T_1$), the solution in this compartment 56 is dissolved at the same concentration as before, but is sufficiently below the saturation concentration that when the liquid is supplied for example to the upper part of chamber 14 of the apparatus of FIGS. 1, 3 or 4, the risk of unwanted deposition of the treating material in the supply arrangement is reduced or eliminated, compared to when a solution at or near saturation is used. Moreover, the concentration of the treating solution is controlled in a very simple way. The reservoir 52 can be filled manually at convenient intervals with fresh treating material 60. The simple arrangement with sealed cover 70 avoids the escape of undesirable fumes.

Instead of increasing the temperature in compartment 56, the same effect could be achieved by maintaining the treating solution at the temperature $T_1$ and adding selected amounts of hot water at temperature $T_1$.

Instead of returning the used treating solution into compartment 56 via the conduit 70, it could be returned into compartment 55. For certain applications of the reservoir 52, the supplied treating solution need not be returned to the reservoir.

What is claimed is:

1. A method of applying a treating liquid (10) to a porous body (11) which is a pre-baked carbon component of an aluminium production cell, comprising the steps of:
    (a) inserting the body (11), with its part to be treated located in an upper part of a treating chamber (12);
    (b) applying at least one sealing member(s) (13) to the body so as to isolate a space (14) in the upper part of the treating chamber (12) around the part of the body to be treated from a lower part (15) of the treating chamber around a bottom part of the body which is not to be treated;
    (c) supplying treating liquid (10) to the upper part (14) of the treating chamber to cover the part of the body to be treated with the treating liquid;
    (d) applying a pressure differential to intake an amount of the treating liquid into pores in the part of the body to be treated;
    (e) removing remaining treating liquid from the upper part (14) of the treating chamber before or during step (f); and
    (f) freeing the body (11) from the sealing member(s) (13), and removing the treated body from the treating chamber (12).

2. The method of claim 1, wherein application of the pressure differential fills said pores with treating liquid, the application of the pressure differential being continued at least until all of the pores of the part of the body being treated are filled.

3. The method of claim 1, wherein the pressure differential is applied by applying a vacuum to the lower part (15) of the treating chamber (12).

4. The method of claim 1, wherein the sealing member(s) (13) is/are applied around sides of the body (11) to be treated.

5. The method of claim 4, comprising adjusting the sealing member(s) (13) to allow a loose fit around a body (11), permitting, insertion and removal thereof into or from the treating chamber (12), or a sealing fit around a body (11) in the treating chamber (12).

6. The method of claim 5, wherein adjustment of the sealing member(s) (13) is controlled hydraulically, pneumatically, mechanically or electro-mechanically.

7. The method of claim 4, comprising detecting the position of a body (11) introduced into the treating chamber (12), and actuating the sealing member(s) (13) to sealably engage with the body (11) when the body has reached a predetermined position.

8. The method of claim 1, wherein the sealing member(s) (13) is/are applied against a bottom surface of the body (11) to be treated.

9. The method of claim 1, wherein the or each sealing member comprises an elastomeric body (13) which is elastically deformed to provide sealing contact when applied against a body (11) to be treated.

10. The method of claim 1, wherein the treating liquid in the treating chamber is at a temperature above the temperature of the body to be treated.

11. The method of claim 10, wherein the treating liquid in the upper part (14) of the treating chamber is maintained at a temperature in the range 60° to 120° C. by heating it to compensate for heat loss due to contact of the treating liquid with the body (11).

12. The method of claim 1, comprising supplying treating liquid (10) from a reservoir (32,52) to the upper part (14) of the treating chamber; returning treating liquid remaining after treatment in the upper part of the treating chamber back to the reservoir (32,52); and adding components of the treating liquid to the reservoir (32,52) to compensate for consumption of the treating liquid in the treating process.

13. The method of claim 1, wherein the treating liquid in the treating chamber is at substantially the same temperature as the body to be treated.

14. The method of claim 1, wherein the body (11) to be treated is at a temperature above the temperature of the treating liquid in the treating chamber.

15. The method of claim 4, comprising sequentially:
    a') actuating the sealing member(s) (13) to sealably engage with a body (11) inserted in the treating chamber (12) when the body has reached a given position;
    b') filling the upper part (14) of the treating chamber with hot treating liquid;
    c') applying a vacuum to the lower part (15) of the treating chamber;
    d') supplying heat to treating liquid in the upper part (14) of the treating chamber to compensate for heat loss due to contact of the liquid with the body;
    e') stopping the application of a vacuum to the lower part (15) of the treating chamber; and
    f') removing remaining treating liquid from the treating chamber (12), before or after releasing the sealing member(s) (13) to allow removal of the treated body (11) from the treating chamber (12).

16. The method of claim 1, wherein the treating liquid is a hot solution which impregnates the part of the body to be treated, the solution containing an oxidation retardant.

17. The method of claim 16, wherein the treating liquid contains at least one soluble, phosphorous or silicon compound.

18. The method of claim 1, wherein the treating liquid is a suspension containing particles which block the pores of the body to be treated.

19. The method of claim 18, wherein the treating solution contains particulate refractory boride.

20. The method of claim 18 wherein the treating solution contains aluminium powder, chips or cuttings.

21. The method of claim 1, wherein the treating solution contains a colloid selected from colloidal alumina, silica, yttria, ceria, thoria, zirconia, magnesia, lithia, monoaluminium phosphate or cerium acetate.

22. The method of claim 1, wherein the treated body is a pre-baked anode (11) of an aluminium production cell.

23. The method of claim 22, wherein the anode (11) comprises a rod (11') attached to its top face for connection of the anode to a suspension device and for electrical supply, the anode being treated with its rodded end disposed in the upper part (14) of the treating chamber and with its top face up.

24. The method of claim 1, wherein the treated body is part of a sidewall of an aluminium production cell.

25. The method of claim 1, wherein the treated body is a cathode block of an aluminium production cell.

26. The method of claim 1 which comprises providing a saturated solution (10") of the treating agent at a given temperature ($T_1$), deriving from said saturated solution a non-saturated solution (10) of the treating agent, and supplying the non-saturated treating solution (10) to said upper part (14) of the treating chamber.

27. The method of claim 26, wherein said non-saturated solution (to) is derived from the saturated solution (10") by raising its temperature, whereby the non-saturated solution (10) contains the treating agent at the same concentration which corresponds to the saturation concentration at said given temperature ($T_1$), but is at a higher temperature ($T_2$).

28. An apparatus for applying a treating liquid to a porous body (11) by the method of claim 1, comprising:
   A) a treating chamber (12);
   B) at least one sealing member (13) arranged to be applied against a body (11) to be treated placed in the treating chamber so as to isolate an upper part (14) of the treating chamber around the part of the body to be treated from a lower part (15) of the treating chamber around a bottom part of the body which is not to be treated;
   C) means (16, 17) for supplying treating liquid (10) to the upper part (14) of the treating chamber to cover the part of the body (11) to be treated with the treating liquid;
   D) means (18) for applying a pressure differential to intake an amount of the treating liquid (10) into pores in the part of the body (11) to be treated; and
   E) means (20,21) for removing remaining treating liquid from the treating chamber (12).

29. The apparatus of claim 28, wherein the sealing member(s) (13) is/are arranged to fit around sides of the body (11) to be treated.

30. The apparatus of claim 29, comprising means (25,26) for adjusting the sealing member(s) (13) to provide a loose fit around a body (11) thereby permitting insertion and removal thereof into or from the treating chamber (12).

31. The apparatus of claim 30, wherein said adjusting means are hydraulically, pneumatically, mechanically or electro-mechanically controlled.

32. The apparatus of claim 30, comprising a detector (30) for the position of a body (11) introduced into the treating chamber (12), arranged to actuate the sealing member(s) (13) to sealably engage with the body when the body has reached a predetermined position.

33. The apparatus of claim 28, wherein the or each sealing member (13) comprises an elastomeric body which is elastically deformable when applied against a body (11) to be treated.

34. The apparatus of claim 28, wherein the sealing member(s) (13) is/are arranged to be applied against a bottom face of the body (11) to be treated.

35. The apparatus of claim 28, wherein the treating chamber (12) comprises means (31) for heating treating liquid in the upper part (14) of the treating chamber to compensate for heat loss due to contact of the liquid with the body (11).

36. The apparatus of claim 28, comprising a reservoir (32) for treating liquid (10) from which treating liquid is supplied to the upper part (14) of the treating chamber and to which treating liquid remaining in the upper part (14) of the treating chamber after treatment of a body is returned, the reservoir (32) comprising means (36) for adding components of the treating liquid to the reservoir (32) to compensate for consumption of the treating liquid in the treating process.

37. The apparatus of claim 36, wherein the reservoir (52) comprises first and second compartments (55, 56), the first compartment (55) containing a reserve supply (10") of hot treating solution in contact with a mass (60) of the treating agent at a given temperature ($T_1$) at which the treating agent is dissolved at a concentration which corresponds to the saturation concentration at that temperature; the second compartment (56) containing a supply of non-saturated treating solution (10) in which the treating agent is dissolved at the same concentration but at a temperature ($T_2$) above said given temperature ($T_1$) or at the same temperature but a lower concentration, the reservoir (52) further comprising:
   (a) means (61, 62, 63) for maintaining the hot treatment solution in each of the first and second compartments (55, 56) at the respective temperature;
   (b) an outlet conduit (16) for supplying the non-saturated hot treating solution (10) from the second compartment (56) of the vessel to treat a body or material; and
   (c) a conduit (64, 65) for supplying hot treating solution from the first compartment (55) to the second compartment (56) to compensate for consumption/loss of the treating liquid by treatment of the body or material.

38. The apparatus of claim 28, wherein the treating liquid (10) is a hot solution which contains an oxidation retardant.

39. The apparatus of claim 38, wherein the treating liquid contains at least one soluble boron, phosphorous or silicon compound.

40. The apparatus of claim 28, wherein the treating liquid is a suspension containing particles which block the surface pores of the body to be coated.

41. The apparatus of claim 40, wherein the treating solution contains particulate refractory boride.

42. The apparatus of claim 40, wherein the treating solution contains aluminium powder, chips or cuttings.

43. The apparatus of claim 28, wherein the treating liquid contains a colloid selected from colloidal alumina, silica, yttria, ceria, thoria, zirconia, magnesia, lithia, monoaluminium phosphate or cerium acetate.

44. The apparatus of claim 30, comprising a control device arranged to sequentially actuate:
   A) means (25,26) for bringing the sealing member(s) (13) to sealably engage with the body (11) when the body has reached a predetermined position;

B) means (16,17) for filling the upper part (14) of the treating chamber with hot treating liquid (10);

C) means (18) for applying a vacuum to the lower part (15) of the treating chamber;

D) where required, means (31) for supplying heat to treating liquid in the upper part (14) of the treating chamber to compensate for cooling of the liquid by contact with the body;

E) stopping of the means (18) for applying a vacuum to the lower part (15) of the treating chamber; and F) relaxing the means (25, 26) for engaging the sealing member(s) (13) to allow removal of the treated body (11) from the treating chamber (12).

45. The apparatus of claim 28, wherein the lower part (15) of the treating chamber (12) has a sloping surface (44) leading to a sump or channel (43) for collecting remaining treating liquid (10').

* * * * *